United States Patent
Song et al.

(10) Patent No.: US 9,321,343 B2
(45) Date of Patent: Apr. 26, 2016

(54) SYSTEM FOR HYBRID VEHICLE TO ENHANCE PERFORMANCE DURING ELECTRIC MODE

(75) Inventors: Seong Jae Song, Seoul (KR); Sung Tae Cho, Gyeonggi-do (KR); Kyung Shin Lee, Gyunggi-do (KR); Sangjae Lee, Incheon (KR); Yeongil Choi, Seoul (KR)

(73) Assignee: Hyundai Motor Company, Seoul (KR)

( * ) Notice: Subject to any disclaimer, the term of this patent is extended or adjusted under 35 U.S.C. 154(b) by 678 days.

(21) Appl. No.: 13/536,223

(22) Filed: Jun. 28, 2012

(65) Prior Publication Data

US 2013/0110333 A1    May 2, 2013

(30) Foreign Application Priority Data

Oct. 27, 2011    (KR) .................. 10-2011-0110728

(51) Int. Cl.
| | |
|---|---|
| *B60W 20/00* | (2006.01) |
| *B60K 6/448* | (2007.10) |
| *B60K 6/387* | (2007.10) |
| *B60L 11/14* | (2006.01) |
| *B60K 6/26* | (2007.10) |

(52) U.S. Cl.
CPC ............. *B60K 6/448* (2013.01); *B60K 6/387* (2013.01); *B60L 11/14* (2013.01); *B60K 2006/262* (2013.01); *B60L 2220/50* (2013.01); *Y02T 10/6243* (2013.01); *Y02T 10/641* (2013.01); *Y02T 10/70* (2013.01); *Y02T 10/7077* (2013.01)

(58) Field of Classification Search
CPC .......................... B60W 20/00; B60W 10/08
USPC ............................................. 180/65.1–65.51
See application file for complete search history.

(56) References Cited

U.S. PATENT DOCUMENTS

| | | | |
|---|---|---|---|
| 7,240,751 B2 | 7/2007 | Hoare et al. | |
| 8,540,602 B2 * | 9/2013 | Ishikawa ............... | B60K 6/383 180/65.245 |
| 2010/0217547 A1 * | 8/2010 | Cawthorne .......... | G01R 31/343 702/58 |

FOREIGN PATENT DOCUMENTS

| | | |
|---|---|---|
| CN | 101380889 A | 3/2009 |
| CN | 101511625 A | 8/2009 |
| CN | 101521440 A | 9/2009 |
| DE | 102010022527 A1 | 12/2010 |
| EP | 0817359 A1 | 1/1998 |
| JP | 2006-161836 A | 6/2006 |
| JP | 2007-116837 A | 5/2007 |
| JP | 2008537528 A | 9/2008 |

(Continued)

*Primary Examiner* — John Walters
*Assistant Examiner* — James Triggs
(74) *Attorney, Agent, or Firm* — Mintz Levin Cohn Ferris Glovsky and Popeo, P.C.; Peter F. Corless

(57) ABSTRACT

Disclosed is system for a hybrid vehicle in which a rotor in a motor is continuously and directly connected to a transmission and is rotatable with the transmission. A first stator mounted around an exterior side of the rotor is directly connected to a shaft of the engine to be rotatable with the shaft of the engine, and a second stator is fixedly mounted to the exterior side of the motor housing around the rotor. The system may further include a lock-up clutch configured to selectively connect a rotation shaft of the rotor with the shaft of the engine, a first inverter configured to control an operation of the first stator, and a second inverter configured to control an operation of the second stator.

20 Claims, 13 Drawing Sheets

(56) References Cited

FOREIGN PATENT DOCUMENTS

| | | |
|---|---|---|
| JP | 2009247075 A | 10/2009 |
| JP | 2010-012937 A | 1/2010 |
| JP | 2011-062019 A | 3/2011 |
| KR | 10-0755046 | 7/2007 |
| WO | 97/08435 A1 | 3/1997 |
| WO | 2008/078817 A1 | 7/2008 |

* cited by examiner

FIG. 3

| State of Vehicle | Mode | | Components of System | | | |
|---|---|---|---|---|---|---|
| | | | Engine | First Stator | Second Stator | Lock-Up Clutch |
| Stopped | Engine Starting | | OFF → ON | Starting | OFF | Open |
| | Charging | | ON | Generating Electricity | OFF | Open |
| Driving | Driving at EV | Low -Power | OFF | OFF | Operating | Open |
| | | High -Power | OFF | Operating | Operating | Open |
| | Driving at HEV (Engine+Motor) | | ON | Operating /Generating Electricity | Operating /Generating Electricity | Close |
| | mode conversion (EV → HEV) | | OFF → ON | Starting | Operating | Open |
| | Generating Electricity During Driving | | ON | OFF | Generating Electricity | Close |
| | Creep Driving | Normal | OFF | OFF | Operating | Open |
| | | Engine Only | ON | Generating Electricity | OFF | Open |
| Braking | Regenerative Braking | | OFF | Generating Electricity/Off | Generating Electricity | Close |

SYSTEM FOR HYBRID VEHICLE TO ENHANCE PERFORMANCE DURING ELECTRIC MODE

CROSS-REFERENCE TO RELATED APPLICATION

This application claims priority to and the benefit of Korean Patent Application No. 10-2011-0110728 filed in the Korean Intellectual Property Office on Oct. 27, 2011, the entire contents of which are incorporated herein by reference.

BACKGROUND OF THE INVENTION (a) Field of the Invention

The present invention relates to a system for a hybrid vehicle. More particularly, the present invention relates to a system for a hybrid vehicle that is applied to a plug-in hybrid vehicle and enhances driving performance at an electric vehicle (EV) mode.

(b) Description of the Related Art

A hybrid vehicle is a vehicle that uses two or more distinct power sources to move the vehicle. The term most commonly refers to hybrid electric vehicles (HEVs), which combine an internal combustion engine and one or more electric motors powered by a battery. However, alternative forms of hybrid vehicles do exist, Hybrid Fuel cell vehicles.

Hybrid vehicles have become increasingly popular over the last couple of years due to their high fuel efficiency and low impact on the environment.

A conventional hybrid system, as shown in FIG. 1A, typically includes two motors 3 and 5 and a power delivery device 4 (e.g., a clutch). Engine starting and generation of electricity is performed typically by a first motor 3 (e.g., Hybrid Starter Generator: HSG) disposed on an engine side and driving and regenerative braking is performed by a second motor 5 disposed on a transmission side. In addition, a clutch 4 operates as a power delivery device for engaging and disengaging torque from the engine to the transmission 2.

When the vehicle operates in an electric vehicle mode, the engine 1 is disconnected from the transmission 2 via the clutch 4 and the vehicle is driven only by power from the motor 5 as shown in FIG. 1B. When the vehicle operates in a hybrid mode, the clutch 4 between the engine 1 and the motor 1 is operated and driving torque of the engine is transmitted to the transmission 2 as shown in FIG. 1C.

Recently, however, manufactures have begun to introduce another type of hybrid vehicle known as a plug-in hybrid vehicle (PHEV). In a PHEV, capacity of the battery is increased compared with a conventional hybrid batteries and the battery is charged via commercial electricity rather than by regenerative braking or a generator. Therefore, these vehicles allow a driver to operate the vehicle using just electrical energy (i.e., an EV mode) when driving short distances and operate the vehicle in a conventional HEV mode once the battery has been discharged.

Thus a PHEV can be driven by using both or either of the internal combustion engine and the electric motor depending upon how far the driver is driving. In these types of hybrid vehicles, a high-voltage battery which can be easily charged by electricity and typically having a large capacity is mounted in somewhere within the plug-in hybrid vehicle.

Because the hybrid vehicle are typically expect to perform much like conventional internal combustion vehicles, enhanced driving performance while in the electric vehicle mode is expected by consumers as well and thus, output capacity of the electric motor should be increased compared to a conventional hybrid vehicle.

In order to increase the output capacity of the electric motor, increase of material cost is often as a result unavoidable and total manufacturing cost resultantly increases, as well.

Further, since the second motor/generator MG2 is in charge of providing the entire power output for driving the vehicle and the first motor/generator MG1 is used for engine starting and generating electricity during the EV mode only. Thus, sufficient driving performance cannot be guaranteed through the second motor/generator MG2 operating in the EV mode.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a system for a hybrid vehicle having advantages of enhancing driving performance while operating the hybrid vehicle in an electric vehicle mode while reducing manufacturing costs.

A system for a hybrid vehicle according to an exemplary embodiment of the present invention may include an engine, a transmission, a motor, and a battery. In one or more exemplary embodiments, the motor may include a rotor continuously and directly connected to the transmission and rotatable with the transmission, a first stator mounted on an exterior side of the rotor and directly connected to a shaft of the engine to be rotatable with the shaft of the engine, and a second stator fixedly mounted on the exterior side of the rotor. The system may further include a lock-up clutch configured to selectively connect a rotation shaft of the rotor with the shaft of the engine.

The system may further include: a first inverter configured to control an operation of the first stator; and a second inverter configured to control an operation of the second stator.

The system may further include: a Low Voltage DC-DC Converter (LDC) configured to increase or drop a voltage of the battery and to supply the voltage to each electric component; a regenerative braking operation configured to convert kinetic energy of the vehicle consumed as friction into electrical energy when braking the vehicle; and a hydraulic pump configured to supply oil to the engine or the transmission.

The first stator may be rotated to start the engine when the vehicle is started from a stopped state. The first stator may also generate electricity by using driving torque from the engine to charge the battery when the vehicle charges the battery at the stopped state.

In some exemplary embodiments of the present invention, vehicle may be driven by operating the second stator when the vehicle drives at a low-power electric vehicle (EV) mode. The vehicle may also be driven by operating both of the first stator and the second stator when the vehicle drives at a high-power electric vehicle (EV) mode, and by operating the engine and the first or the second stator when the vehicle drives at a hybrid electric vehicle (HEV) mode.

The engine may be started by means of the first stator and the second stator may be operated when a mode of the vehicle is converted from the electric vehicle (EV) mode into the hybrid electric vehicle (HEV) mode.

The second stator may generate electricity by using driving torque from the engine to charge the battery when the vehicle is operating in a hybrid electric vehicle (HEV) mode. Additionally, the first stator or the second stator may generate electricity by using braking force of the vehicle to charge the battery when the vehicle performs regenerative braking.

BRIEF DESCRIPTION OF THE DRAWINGS

It should be understood that the appended drawings are not necessarily to scale, presenting a somewhat simplified representation of various preferred features illustrative of the basic principles of the invention.

In the figures, reference numbers refer to the same or equivalent parts of the present invention throughout the several figures of the drawing.

FIG. 3 is a table for explaining an operation of a system for a hybrid vehicle according to an exemplary embodiment of the present invention at each mode.

DESCRIPTION OF SYMBOLS

Figure 1A:
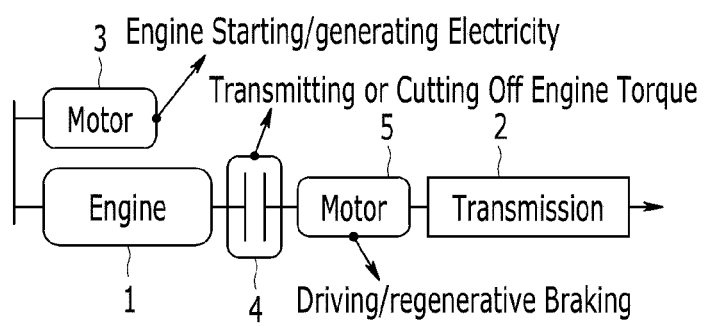
FIG. 1A-C is a schematic diagram of a conventional system for a hybrid vehicle.
Figure 1B:
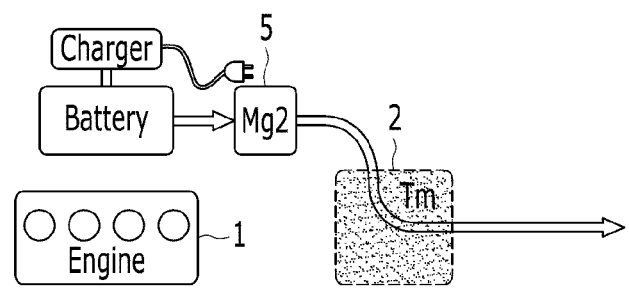
Figure 1C:
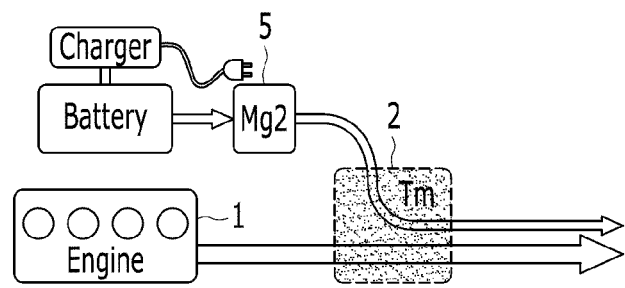

10: system for a hybrid vehicle
100: engine
200: transmission
300: motor
310: rotor
320: first stator
321: first inverter
330: second stator
331: second inverter
340: lock-up clutch
400: battery
500: LDC
600: regenerative braking
700: hydraulic pump It should be understood that the appended drawings are not necessarily to scale, presenting a somewhat simplified representation of various preferred features illustrative of the basic principles of the invention.

In the figures, reference numbers refer to the same or equivalent parts of the present invention throughout the several figures of the drawing.

Detailed Description of the Embodiments

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In overall specification, in addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function or operation, and can be implemented by hardware components or software components and combinations thereof.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

An exemplary embodiment of the present invention will hereinafter be described in detail with reference to the accompanying drawings.

Figure 2:
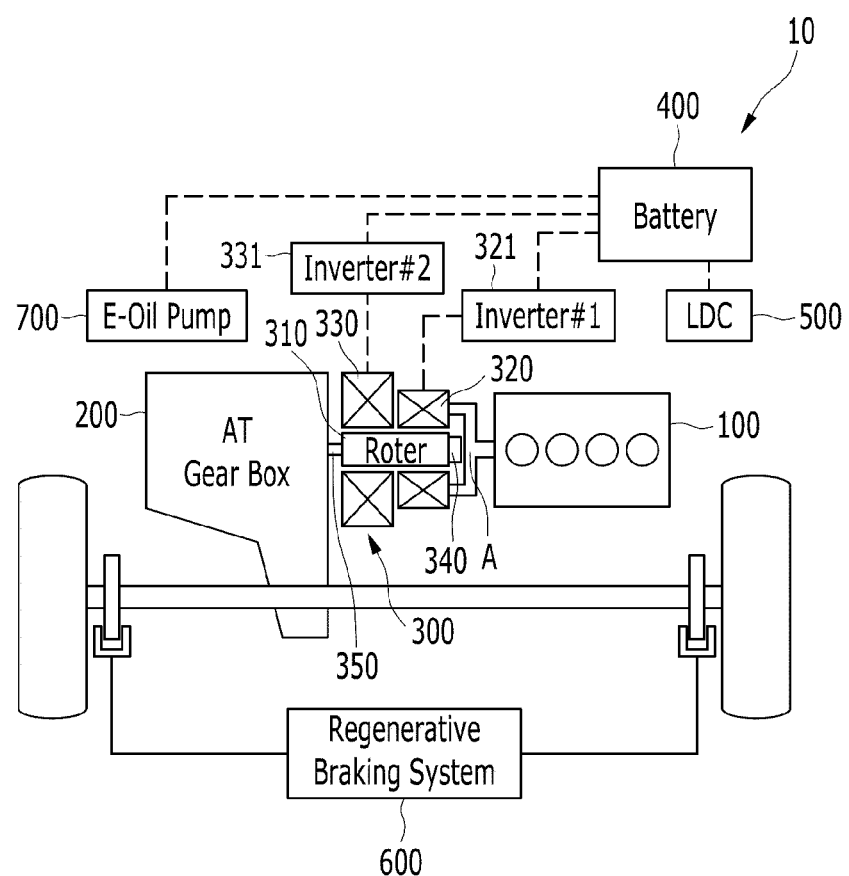
FIG. 2 is a schematic diagram of a system for a hybrid vehicle according to an exemplary embodiment of the present invention.

FIG. 2 is a schematic diagram of a system for a hybrid vehicle, e.g., a plug-in hybrid vehicle (PHEV), according to an exemplary embodiment of the present invention. As shown in FIG. 2, a system 10 for a hybrid vehicle according to an exemplary embodiment of the present invention includes an engine 100, a transmission 200, a motor 300, a battery 400, a LDC (Low Voltage DC-DC Converter) 500 configured to convert a voltage of the battery 400 into a target voltage, a regenerative braking system 600, and a hydraulic pump 700. The motor 300 includes a rotor 310 and first and second stators 320 and 330 mounted on or around an exterior side of the rotor 310. The system 10 may further include a first inverter 321 and a second inverter 331 connected respectively to the first stator 320 and the battery 400 and the second stator 330 and the battery 400.

That is, an exemplary embodiment of the present invention can perform power delivery from the engine 100, engine starting, generation of electricity while operating, and running in an electric vehicle (EV) mode by using the motor 300 including the rotor 310 and the first and second stators 320 and 330 mounted on the exterior of the rotor 310.

In some exemplary embodiments of the present invention, the rotor 310 may be provided between the engine 100 and the transmission 200 and connects the engine 100 with the transmission 200 or disconnects the engine 100 from the transmission 200.

For this purpose, the rotor 310 is continuously connected to the transmission 200, and a lock-up clutch 340 is provided at a side of the rotor 310 so as to selectively engage the engine 100 with the rotor 310.

The lock-up clutch 340 engages a rotation shaft 350 of the rotor 310 with a shaft of the engine 100 so that torque of the engine 100 is delivered to the rotor 310, or releases the rotation shaft 350 of the rotor 310 from the shaft of the engine 100 so that the torque of the engine 100 is not delivered to the rotor 310.

The first stator 320 is mounted on or around the exterior side of the rotor 310 and is directly connected to the shaft of the engine 100 so as to be movable with the shaft of the engine 100. Therefore, the engine 100 can be started by rotating the first stator 320. Conversely, the first stator 320 is configured to generate electricity while the engine 100 is operating to charge the battery 400.

As shown in FIG. 2, the first stator 320 is configured to perform a clutch function since a part A of the first stator 320 connected to the engine 100 can be engaged with the lock-up clutch 340. Since the rotor 310 and the part A of the first stator 320 perform a function of a conventional engine clutch according to an exemplary embodiment of the present invention, an additional clutch may not be necessary and costs may be reduced.

The second stator 330 is mounted at or around the exterior side of the rotor 310 and is fixed to a motor housing (not shown). The second inverter 321 is configured to control the second stator 330 such that the motor 300 can deliver a driving torque to the transmission 200.

In addition, the second inverter 321 is configured to control the second stator 330 so that the motor 300 can perform regenerative braking. Thus, when the driver applies the brakes, a braking force of the vehicle is delivered to the second stator 330 through the transmission 200 and the rotor 310 so that the second stator 330 generates electricity, thereby charging the battery 400.

The first inverter 321 and the second inverter 331 convert DC voltage of the battery 400 into AC voltage and apply the AC voltage to the first stator 320 and the second stator 330 to control operations of the first stator 320 and the second stator 330. Since both of the first inverter 321 and the second inverter 331 are provided independently, the operations of the first stator 320 and the second stator 330 can be independently controlled.

The low voltage DC-DC converter (LDC) 500 converts DC voltage into AC voltage, raises or drops the AC voltage by using coils, trances, capacitances, converts the AC voltage into the DC voltage, and supplies the DC voltage to each electric component.

The regenerative braking system 600 is configured to convert kinetic energy of the vehicle consumed as friction while the vehicle is braking into electrical energy.

The hydraulic pump 700 is configured to supply oil to the engine 100 or the transmission 200. In one or more exemplary embodiments, the hydraulic pump 700 may be an electric oil pump (EOP) or a mechanical oil pump (MOP). The electric oil pump 700 may receive driving power from the battery 400.

The system 10 for a hybrid vehicle according to an exemplary embodiment of the present invention may be a plug-in hybrid vehicle (PHEV). The plug-in hybrid vehicle (PHEV) includes high-voltage battery 400 of typically having a large capacity, and the high-voltage battery 400 can be charged by commercial electricity.

Hereinafter, an operation of each component at each mode of the hybrid vehicle according to an exemplary embodiment of the present invention will be described in detail, referring to FIG. 3 to FIG. 7.

FIG. 3 is a table for explaining an operation of a system for a hybrid vehicle according to an exemplary embodiment of the present invention at each mode, and FIG. 4 to FIG. 7 are schematic diagrams for illustrating operations of the system according to an exemplary embodiment of the present invention at each mode.

Figure 4A:
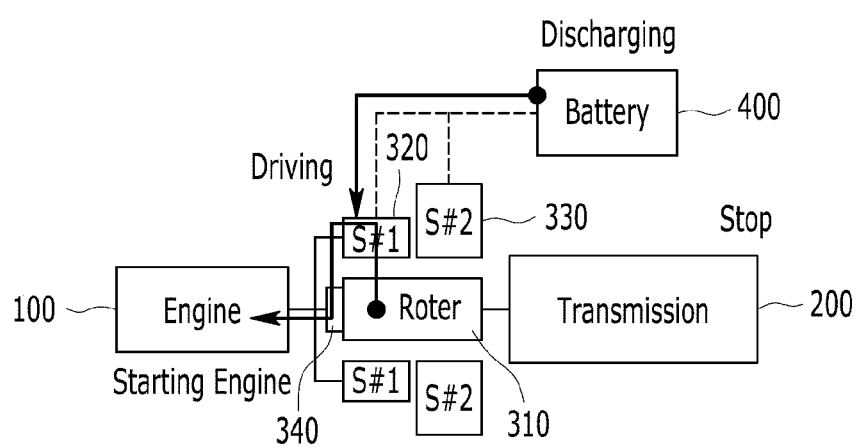
FIG. 4A-B is a schematic diagram for illustrating an operation of a system according to an exemplary embodiment of the present invention when a vehicle is stopped.

In a case that the engine 100 is started when the vehicle is stopped, the first stator 320 is rotated by electricity of the battery 400 to start the engine 100, as shown in FIG. 4A. Therefore, the first stator 320 is rotated to start the engine 100, and the lock-up clutch 340 is released (Open) and the second stator 330 is an Off-state since the vehicle is stopped. In the illustrative embodiment of the present invention, the Off-state of the stators 320 and 330 means that the corresponding stator does not affect an operation of the motor 300 (e.g., the stator is not generating a magnetic field or a counter magnetic field by the inverter).

Figure 4B:
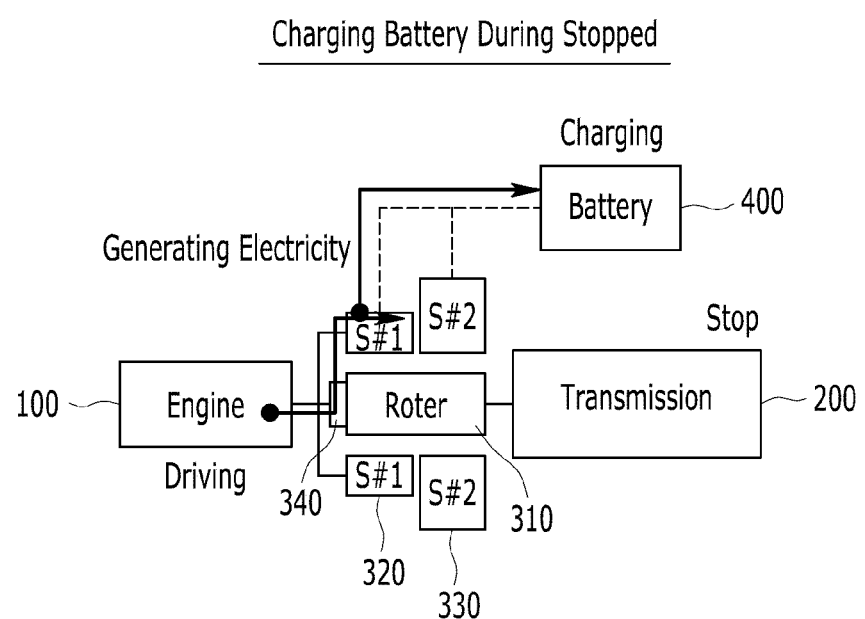

When the battery 400 is being charged when the vehicle is stopped, the first stator 320 generates electricity by using the driving torque of the engine 100 to charge the battery 400, as shown in FIG. 4B. Therefore, the engine 100 is running and the first stator 320 connected to the engine 100 generates electricity and charges the battery 400. Since the vehicle is stopped, the second stator 330 is in an Off-state and the lock-up clutch 340 is released. The transmission 200 of the vehicle is engaged to a D-range and the battery 400 is configured to be charged only when a gear brake is operated.

Figure 5A:
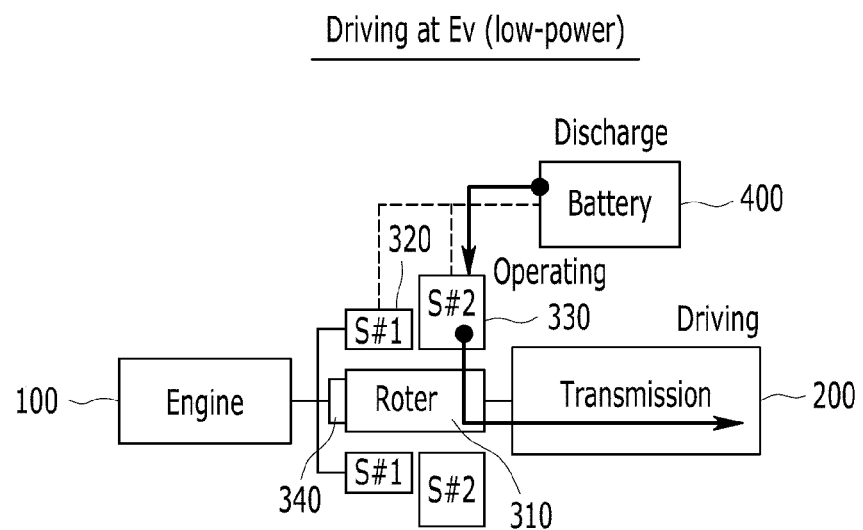
FIG. 5A-B is a schematic diagram for illustrating an operation of a system according to an exemplary embodiment of the present invention when a vehicle drives at an electric vehicle mode.

When the vehicle is driving in a low-power electric vehicle (EV) mode, the second stator 330 is operated by power from the battery 400, as shown in FIG. 5A. When the vehicle is operating in an electric vehicle mode, the engine 100 is an Off-state and the lock-up clutch 340 is released. Since the vehicle is operating at the low-output state, the vehicle is driven only by operation of the second stator 330 and the first stator 320 is the Off-state. Herein, the Off-state of the engine 100 means a state where the engine 100 is not operating or "turning over."

Figure 5B:
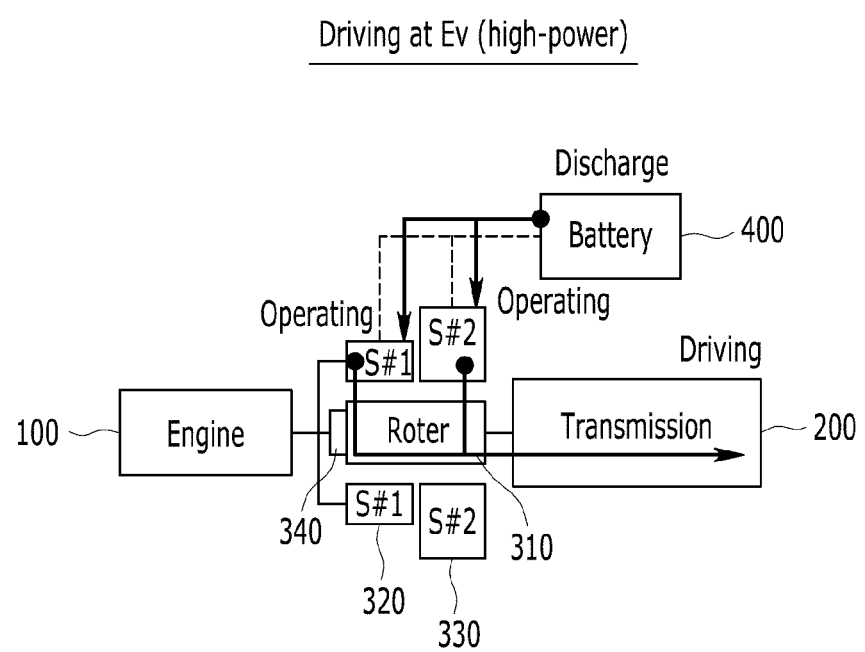

When the vehicle operates at a high-power electric vehicle (EV) mode, both of the first stator 320 and the second stator 330 are operated by power from the battery 400, as shown in FIG. 5B. Since the vehicle is operating in a high-power state, driving torque generated by operation of the second stator 330 is not sufficient. Therefore, the first stator 320 as well as the second stator 330 is operated. Since the vehicle drives at the electric vehicle mode, the engine 100 is still in an Off-state and the lock-up clutch 340 is released. Since an exemplary embodiment of the present invention can operate two stators 320 and 330 at the high-power electric vehicle mode so as to drive the vehicle, driving performance in the electric vehicle mode may be improved without a significant increase in costs, compared to the conventional art.

Figure 6A:
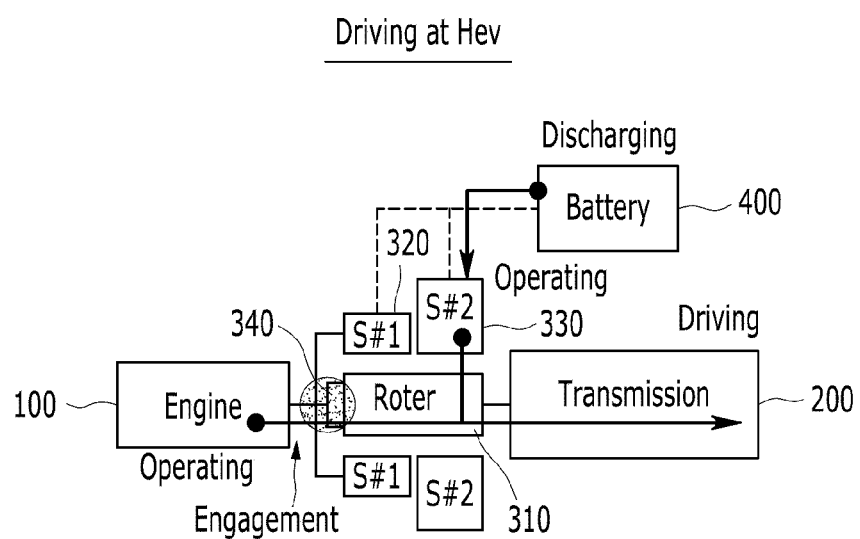
FIG. 6A-B is a schematic diagram for illustrating an operation of a system according to an exemplary embodiment of the present invention when a vehicle drives at a hybrid electric vehicle mode.

FIG. 6 is a schematic diagram for illustrating an operation of a system according to an exemplary embodiment of the present invention when a vehicle is being operated in a hybrid electric vehicle mode. When the vehicle is being operated in a hybrid electric vehicle (HEV) mode, the engine 100 is driven and the first stator 320 or the second stator 330 is operated by power from the battery 400, as shown in FIG. 6A. Since the engine 100 is driven and the lock-up clutch 340 is engaged (Closed), the driving torque of the engine 100 is delivered to the transmission 200. In addition, the first stator 320 or the second stator 330 or both may be operated together with the engine 100. That is, either of the first stator 320 and the second stator 330 or both may be operated along with the engine 100 to power the vehicle in a hybrid electric vehicle mode. Whether the first or second stator 320 and 330 or both are operated is determined according to driving conditions and target output.

Figure 6B:
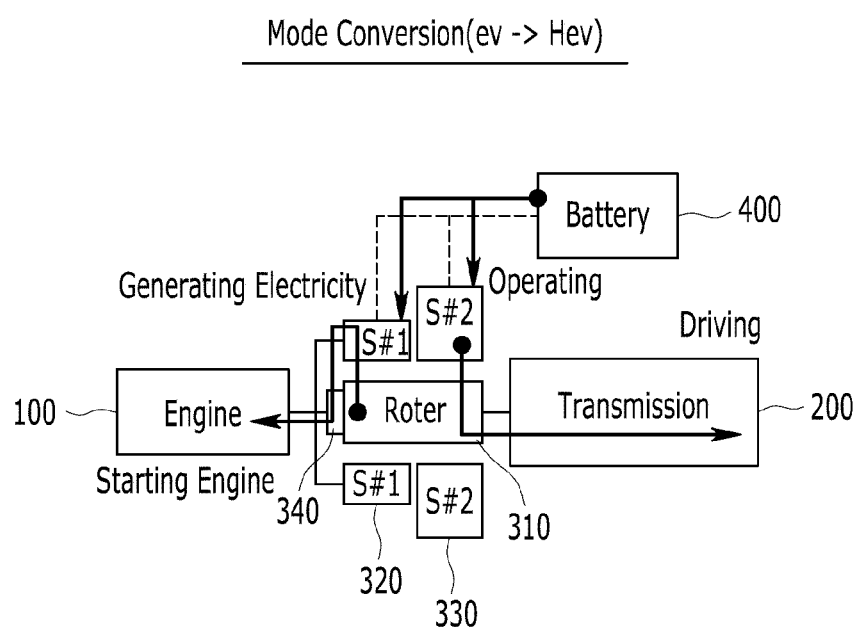

When the vehicle is converted from the electric vehicle (EV) mode into the hybrid electric vehicle (HEV) mode, the engine 100 is started by means of the first stator 320 and the second stator 330 is operated, as shown in FIG. 6B. If the electric vehicle (EV) mode is converted into the hybrid electric vehicle (HEV) mode, the driving torque of the engine 100 and the driving torque of the motor 300 are used for driving the vehicle. Therefore, the engine 100 is started by operating the first stator 320 and the lock-up clutch 340 is engaged to deliver the driving torque of the engine 100 to the transmission 200.

Figure 7A:
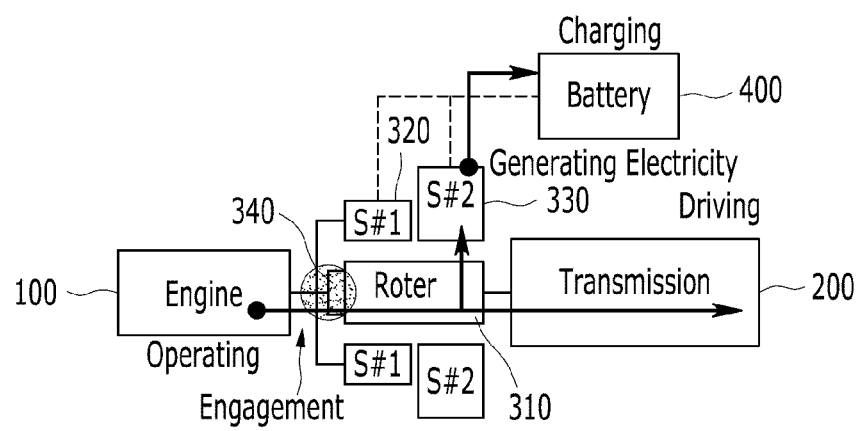
FIG. 7A-B is a schematic diagram for illustrating an operation of a system according to an exemplary embodiment of the present invention when charging a battery.

FIG. 7 is a schematic diagram for illustrating an operation of a system according to an exemplary embodiment of the present invention when charging a battery. In a case that the battery 400 is charged during the vehicle drives at the hybrid electric vehicle (HEV) mode, the second stator 330 generates electricity via the driving torque of the engine 100 when the lock-up clutch 340 is engaged, as shown in FIG. 7A. Therefore, the battery 400 is charged, accordingly. Since the lock-up clutch 340 is engaged, the vehicle is driven by the driving torque of the engine 100 while at the same time charging the battery.

Figure 7B:
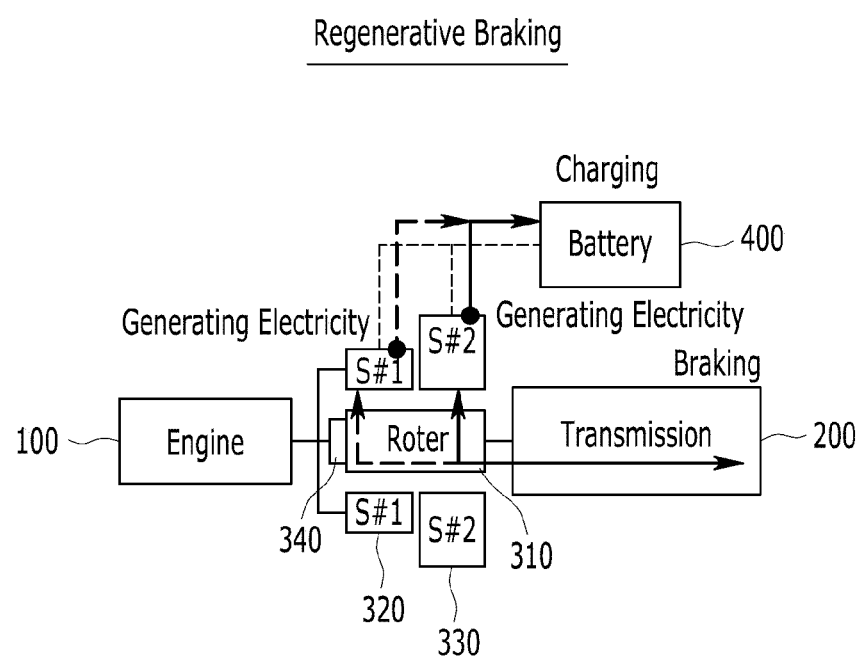

When the vehicle performs regenerative braking, the first stator 320 or the second stator 330 generate electricity by using the braking force of the vehicle to thereby charge the battery 400, as shown in FIG. 7B. For this purpose, the lock-up clutch 340 is engaged, and the braking force of the transmission 200 is delivered to the first and second stators 320 and 330. Since the vehicle is applying brakes, the engine 100 turns off.

When the vehicle is in a creep driving state by using the engine 100, the first stator 320 generates electricity and the second stator 330 is in the Off-state. In addition, the engine 100 is operated but the lock-up clutch 340 is released so that the driving torque of the engine 100 is not delivered to the transmission 200. When the driver does not request acceleration while operating at a low speed or is stopped, use of torque from the engine 100 or the motor 300 is minimized to generate only creep torque according to the creep driving.

When the vehicle is in the creep driving state by using the motor 300, the second stator 330 is operated for creep driving, the first stator 320 and the engine 100 are in Off-states, and the lock-up clutch 340 is released. When the driver does not request acceleration while operating at a low speed or at a stopped, the creep torque is generated only by the second stator 330.

Since a vehicle is driven by operating two stators during a high-power electric vehicle mode according to an exemplary embodiment of the present invention, driving performance at the electric vehicle mode may be improved without increase in capacity of components.

Advantageously, in the conventional art only an engine clutch performs power delivery functions, but both of a lock-up clutch and a motor perform power delivery functions according to an exemplary embodiment of the present invention. Furthermore, since heat loss generated due to slippage of a clutch can be converted into electric energy in the motor, efficiency may be increased as well. Since shock generation in the clutch can be minimized by delivering engine torque to a wheel according to a control of motor torque, drivability may also be improved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A system for a hybrid vehicle comprising:
a motor including a rotor that is continuously connected to a transmission and rotatable with the transmission, wherein the motor includes a first stator mounted on an exterior side of the rotor and directly connected to a shaft of an engine to be rotatable with the shaft of the engine, and a second stator fixedly mounted on the exterior side of the rotor; and
a lock-up clutch configured to selectively connect a rotation shaft of the rotor with the shaft of the engine.

2. The system of claim 1, further comprising:
a first inverter configured to control an operation of the first stator; and
a second inverter configured to control an operation of the second stator.

3. The system of claim 1, further comprising:
a low-voltage DC to DC converter (LDC) configured to increase and drop a voltage of the battery and to supply the voltage to a plurality of electronic components in the vehicle;
a regenerative braking system configured to convert kinetic energy of the vehicle consumed as friction when the vehicle is braking into electrical energy; and
a hydraulic pump configured to supply oil to the engine or the transmission.

4. The system of claim 1, wherein the first stator is rotated to start the engine when the vehicle is started during a stopped state.

5. The system of claim 1, wherein the first stator generates electricity by using driving torque from the engine to charge the battery while the vehicle is in a stopped state.

6. The system of claim 1, wherein the vehicle is driven by operating the second stator when the vehicle operates in a low-power electric vehicle mode.

7. The system of claim 1, wherein the vehicle is driven by operating both of the first stator and the second stator when the vehicle operates in a high-power electric vehicle mode.

8. The system of claim 1, wherein the vehicle is driven by operating the engine and the first or the second stator when the vehicle operates in a hybrid electric vehicle mode.

9. The system of claim 1, wherein the engine is started by means of the first stator and the second stator is operated when a mode of the vehicle is converted from the electric vehicle mode into the hybrid electric vehicle mode.

10. The system of claim 1, wherein the second stator generates electricity by using driving torque of the engine to charge the battery when the battery is charged while the vehicle operates in a hybrid electric vehicle mode.

11. The system of claim 1, wherein the first stator or the second stator generates electricity by using braking force from the vehicle to charge the battery when the vehicle performs regenerative braking.

12. The system of claim 1, wherein the hybrid vehicle is a plug-in hybrid vehicle.

13. A power train for a hybrid vehicle comprising:
an engine configured to selectively provide power to a transmission; and
a motor including a rotor that is continuously and directly connected to the transmission and rotatable with the transmission, wherein the motor includes a first stator mounted rotatably around an exterior side of the rotor and directly connected to a shaft of the engine to be rotatable with the shaft of the engine, and a second stator fixedly mounted on the exterior side of the rotor; and
a lock-up clutch configured to selectively connect a rotation shaft of the rotor with the shaft of the engine to provide power from the engine to the rotor in the motor.

14. The power train of claim 13, further comprising:
a first inverter configured to control an operation of the first stator; and
a second inverter configured to control an operation of the second stator.

15. The power train of claim 13, further comprising:
a low-voltage DC to DC converter (LDC) configured to increase and drop a voltage of the battery and to supply the voltage to a plurality of electronic components in the vehicle;
a regenerative braking system configured to convert kinetic energy of the vehicle consumed as friction when the vehicle is braking into electrical energy; and
a hydraulic pump configured to supply oil to the engine or the transmission.

16. The power train of claim 13, wherein the first stator generates electricity by using driving torque from the engine to charge the battery while the vehicle is in a stopped state.

17. The power train of claim 13, wherein the vehicle is driven by operating the second stator when the vehicle operates in a low-power electric vehicle mode.

18. The power train of claim 13, wherein the vehicle is driven by operating both of the first stator and the second stator when the vehicle operates in a high-power electric vehicle mode.

19. The power train of claim 13, wherein the vehicle is driven by operating the engine and the first or the second stator when the vehicle operates in a hybrid electric vehicle mode.

20. The power train of claim 13, wherein the engine is started by means of the first stator and the second stator is operated when a mode of the vehicle is converted from the electric vehicle mode into the hybrid electric vehicle mode.

* * * * *